US008480398B1

(12) United States Patent
Yunten (10) Patent No.: US 8,480,398 B1
(45) Date of Patent: Jul. 9, 2013

(54) YUNTEN MODEL COMPUTER SYSTEM AND LAB KIT FOR EDUCATION

(76) Inventor: Tamer Yunten, Christiansburg, VA (US)

( * ) Notice: Subject to any disclaimer, the term of this patent is extended or adjusted under 35 U.S.C. 154(b) by 1162 days.

(21) Appl. No.: 12/316,719

(22) Filed: Dec. 16, 2008

Related U.S. Application Data

(60) Provisional application No. 61/007,861, filed on Dec. 17, 2007.

(51) Int. Cl.
  *G09B 19/00* (2006.01)
(52) U.S. Cl.
  USPC .......................................... 434/118
(58) Field of Classification Search
  USPC .......................................... 434/118
  See application file for complete search history.

(56) References Cited

U.S. PATENT DOCUMENTS

| 4,014,006 | A | * | 3/1977 | Sorensen et al. | 713/600 |
| 4,590,555 | A | * | 5/1986 | Bourrez | 718/103 |
| 4,594,657 | A | * | 6/1986 | Byrns | 710/241 |
| 4,819,201 | A | * | 4/1989 | Thomas et al. | 365/221 |
| 5,748,575 | A | * | 5/1998 | Lee | 369/30.88 |
| 6,152,612 | A | * | 11/2000 | Liao et al. | 703/23 |
| 6,418,459 | B1 | * | 7/2002 | Gulick | 718/104 |
| 6,514,085 | B2 | * | 2/2003 | Slattery et al. | 434/335 |
| 2002/0052978 | A1 | * | 5/2002 | Stall | 709/313 |
| 2003/0113693 | A1 | * | 6/2003 | Yunten | 434/118 |
| 2007/0283135 | A1 | * | 12/2007 | Noda et al. | 712/244 |

* cited by examiner

*Primary Examiner* — Xuan Thai
*Assistant Examiner* — Jerry-Daryl Fletcher (57) ABSTRACT

A compact and simple computer system comprising: a 16×4 bit RAM housing a multiprocessing OS, two application programs, and an input interrupt routine, whereas a small modular processor gives life to time-shared execution of the two application programs under the management of the OS while implementing process synchronization. A student builds the totality of this model computer using simple standard SSI circuit chips which are the components of a per-student lab kit designed and documented for physical implementation of this simple but rich-in-information-instruction operational computer. The computer model is generic in nature and can be augmented and applied in multitude of areas in various ways.

2 Claims, 11 Drawing Sheets

Overview of Yunten Model Computer System

Figure 1. Overview of Yunten Model Computer System

Figure 2. Hardware kit components for building the model computer

Figure 3. Detailed view of the YMCS

Figure 4. A programmed RAM and modular-processor components

| Instruction | Operation Code | Description |
| --- | --- | --- |
| Inc A | 0000 | Increments register A by one. |
| Inc B | 0001 | Increments register B by one |
| Mov AB | 0010 | Moves register A contents into register B |
| Mov BA | 0011 | Moves register B contents into register A |
| Initialize | 0100 | Initializes the process queue with program addresses |
| Wakeup_process | 0101 | Activates the process in front of the queue |
| Update_process_queue | 0110 | Moves every process queue member one ahead |
| Jmp ProgA | 0111 | Jumps to the beginning of program A |
| Jmp ProgB | 1000 | Jumps to the beginning of program B |
| Wait full | 1001 | Waits for semaphore "full" to become 1 |
| Read_sync_buf | 1010 | Reads synchronous data into register B |
| Signal empty | 1011 | Increments semaphore "empty" by one |

Figure 5. YMCS Instructions

Figure 6. Execution Driver Module (EDM) and its environment

Figure 7. Application Program Instructions Module (APIM)

Figure 8. APIM Control Unit

Figure 9. Operating System Module

Figure 10. Time-Slice Interrupt Circuit

Figure 11. Control Unit of the OS module

Figure 12. Process Synchronization Module

Figure13. Process Synchronization Control Unit

Figure 14. Generic view of YMCS

US 8,480,398 B1

YUNTEN MODEL COMPUTER SYSTEM AND LAB KIT FOR EDUCATION

This Nonprovisional application claims the benefits of U.S. Provisional Application No. 61/007,861 filed on Dec. 17, 2007.

A modern computer system is a complicated machine composed of difficult to teach/understand components. A typical computer system comprises hardware and software. The hardware is physical in nature and also implements conceptual functions via physical logic circuits. Because of its physical nature, hardware can best be learned via hands-on experience. Software is the coded definition of hardware's operation. Software is conceptual in nature but not physical. Software is further divided into two general categories: system software (e.g., an operating system) and application software (e.g., a word processor). Each of these three system components (i.e., hardware, operating system, application software) are sophisticated within themselves and it takes a long time for a student to understand how these components relate to each other and interact. Also, a student who has not experienced the physical nature of hardware may not truly see the distinction between hardware and software and/or where software stops and where hardware begins. There are also system functions that involves cooperation of both hardware and software (e,g., process preemption, process synchronization) and lack of hardware knowledge results in incomplete understanding of these mechanisms. A teaching tool that effectively delivers totality of these concepts in a short time in a clear and concise manner is needed. The Yunten Model Computer System (YMCS) and its lab kit meet this need.

SUMMARY OF THE INVENTION

The Yunten's Model Computer System (YMCS) incorporates in a condensed and clear structure the nature and the relationships between computer system components of application software, system software, and hardware as well as including the modern day concepts of multiprocessing, process synchronization via simplified mechanisms. A student learns these concepts via hands-on experience by physically building this model computer via SSI circuit chips/functions using a per-student laboratory kit that is a part of this invention.

Figure 1:
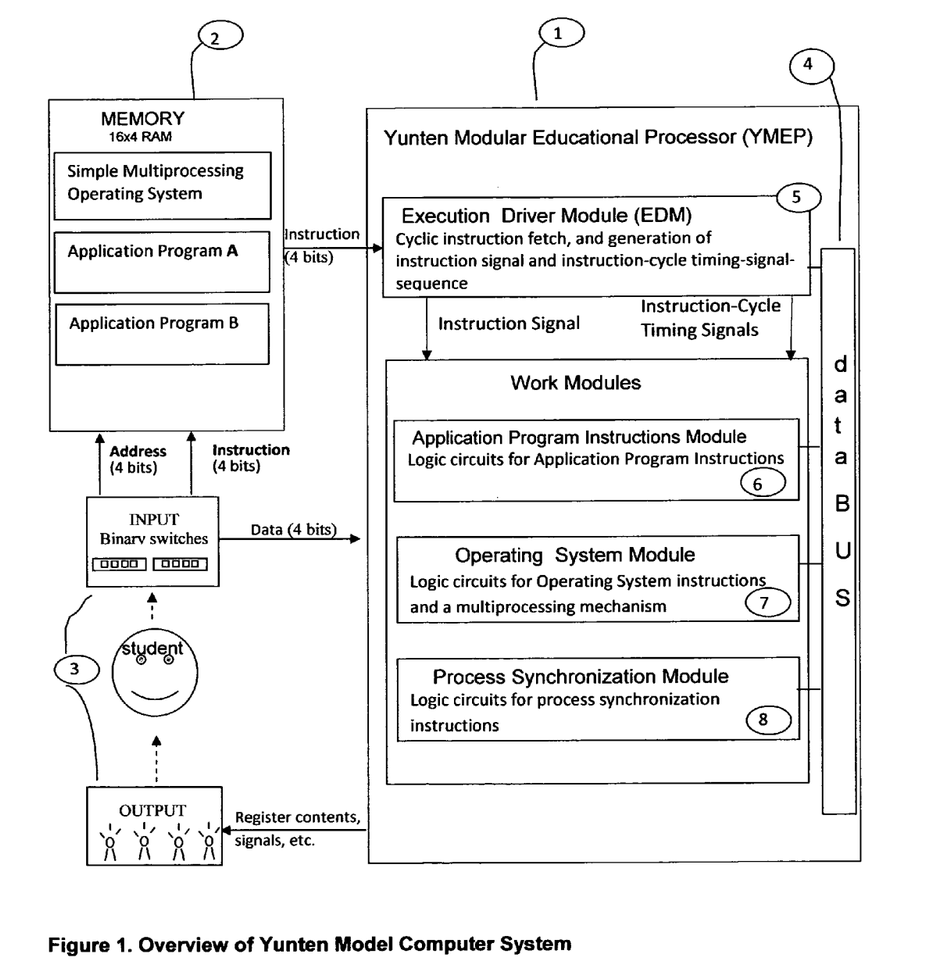
FIG. 1 shows an overview of the Yunten Model Computer System (YMCS)

FIG. 1 shows an overview of the Yunten Model Computer System (YMCS). It includes the Yunten Modular Educational Processor (YMEP) 1, a small RAM 2, and simple machine-language level I/O devices 3 (DIP switches for input, LED's for output). Throughout this document, a component appearing in more than one diagram will be consistently labeled with the same reference number.

The YMEP 1 that a student builds comprises the following modules:

Execution Driver Module (EDM) 5;
Application Program Instructions Module 6;
Operating System Module 7;
Process Synchronization Module 8.

This modular structure separates the processor functions both conceptually and physically. In addition to making the building process easier, this separation clearly identifies the roles of these modules as parts of the system and contributes to achieving the invention goal. All these modules can communicate via the data BUS 4.

The system model is designed with special emphasis on making it simple and easy to build. In this particular embodiment, the RAM 2 contains only sixteen 4-bit addressable storage elements. It only stores operation codes of program instructions, and the instruction operands are implicit in the operation codes. To maintain simplicity, each of the YMEP modules 5, 6, 7, 8 in FIG. 1 implement a minimum number of simplified instructions and/or mechanisms to perform and demonstrate their functions. Such simplifications greatly reduce the complexity of the logic circuits and reduce the time and effort that a student puts in while building the computer system. However these simplifications do not interfere with delivering to the student the intended knowledge. On the contrary, they make it easier to see the underlying mechanisms and functions which are practically the same or similar and expanded in large commercial computers.

Throughout this description document, the word "instruction" is generically used to represent both conventional computer hardware instructions (e.g., increment register A) and larger functions (unlimited in size) that will be implemented in hardware as atomic machine instructions using data structures also implemented in hardware (e.g., update process queue).

The EDM 5 (which will be detailed later) is a simple logic circuit which cyclically generates a sequence of timing signals that constitute an instruction cycle, fetches from RAM 2 fixed-size instruction operation codes and generates for each instruction code an instruction signal, and sends to the appropriate YMEP modules the instruction and timing signals they need to implement their own instructions/functions and internal mechanisms. The work modules 6, 7, and 8 (which will be detailed later) of the YMEP implement a small number of instructions and mechanisms. Each of these modules contains its own control unit circuit and internal registers, buffers, flip-flops (if any), and logic circuits (if any) that it needs.

The EDM 5 of YMEP 1 runs at a slow speed (e.g., execution of an instruction typically takes about four seconds) so that the student can comfortably monitor and verify the correct execution of program instructions that he/she builds. This monitoring is done via LED's connected to the registers, timing signals, instructions signals, the BUS, etc. The student can also easily adjust the execution speed for a slower or faster rate (described later).

Figure 2:
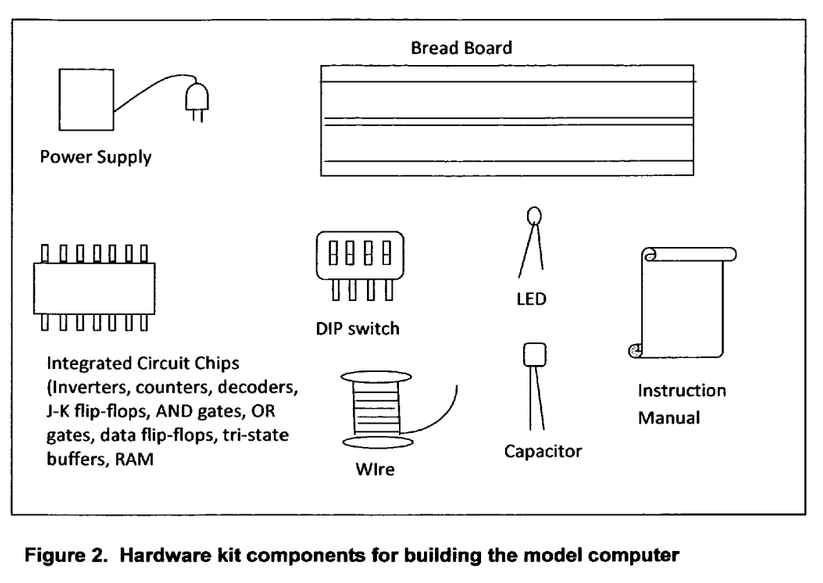
FIG. 2 shows hardware kit components and an example computer

FIG. 2 shows the components of the lab kit that a student uses in building the YMCS.

The LAB project manual of the kit in FIG. 2 guides the student during this building process. The student installs the integrated circuit chip on the breadboard and interconnect them via wires. The first project builds the EDM 5 of FIG. 1 and installs memory 2 and the I/O devices 3. The remaining four projects describe how to build modules 6, 7, and 8 in FIG. 1. The modules 6, 7, and 8 can be built and tested for operational correctness in any preferred sequence.

The components in FIG. 1 (except for the project manual) are commercially available electronics products and are not part of this invention.

The RAM layout in FIG. 1 is for a target computer that implements all four work modules 6, 7, and 8. The YMCS embodiment that will be presented below will use the RAM layout in FIG. 1. As this embodiment will show, in spite of this small RAM, the YMCS capability of implementing high-level software functions as machine instructions makes it possible to deliver to its builder a large volume of knowledge.

DETAILED DESCRIPTION

Figure 3:
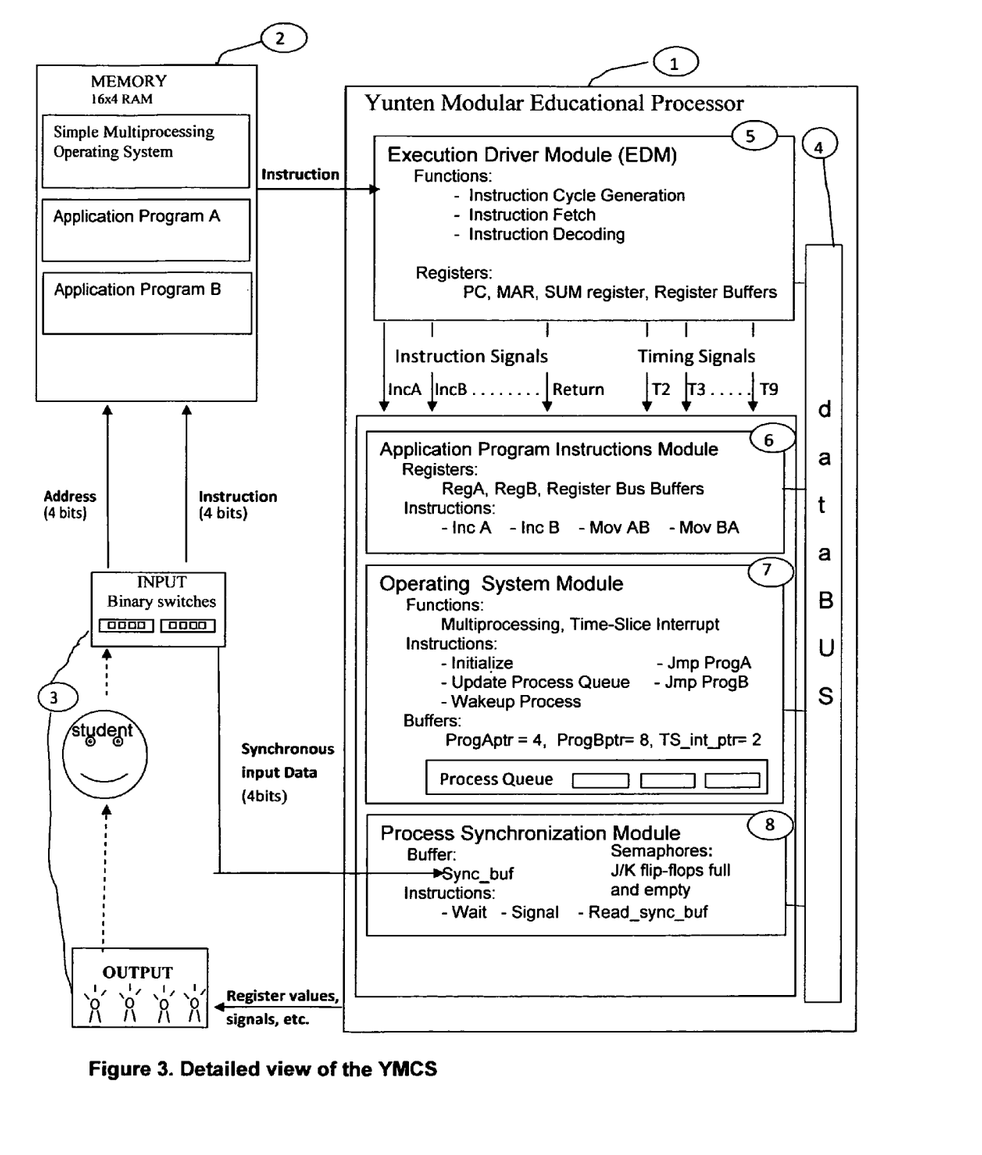
FIG. 3 shows a detailed view of the YMCS

FIG. 3 shows the detailed view of the YMCS embodiment. The memory 2 layout in the figure assumes that the student has implemented all YMEP 1 components 5, 6, 7, and 8. Before describing how a student implements these components, to make understanding easier, an execution scenario that exemplifies the operation of this embodiment will be presented. The detailed design of the modules will follow this presentation.

Figure 4:
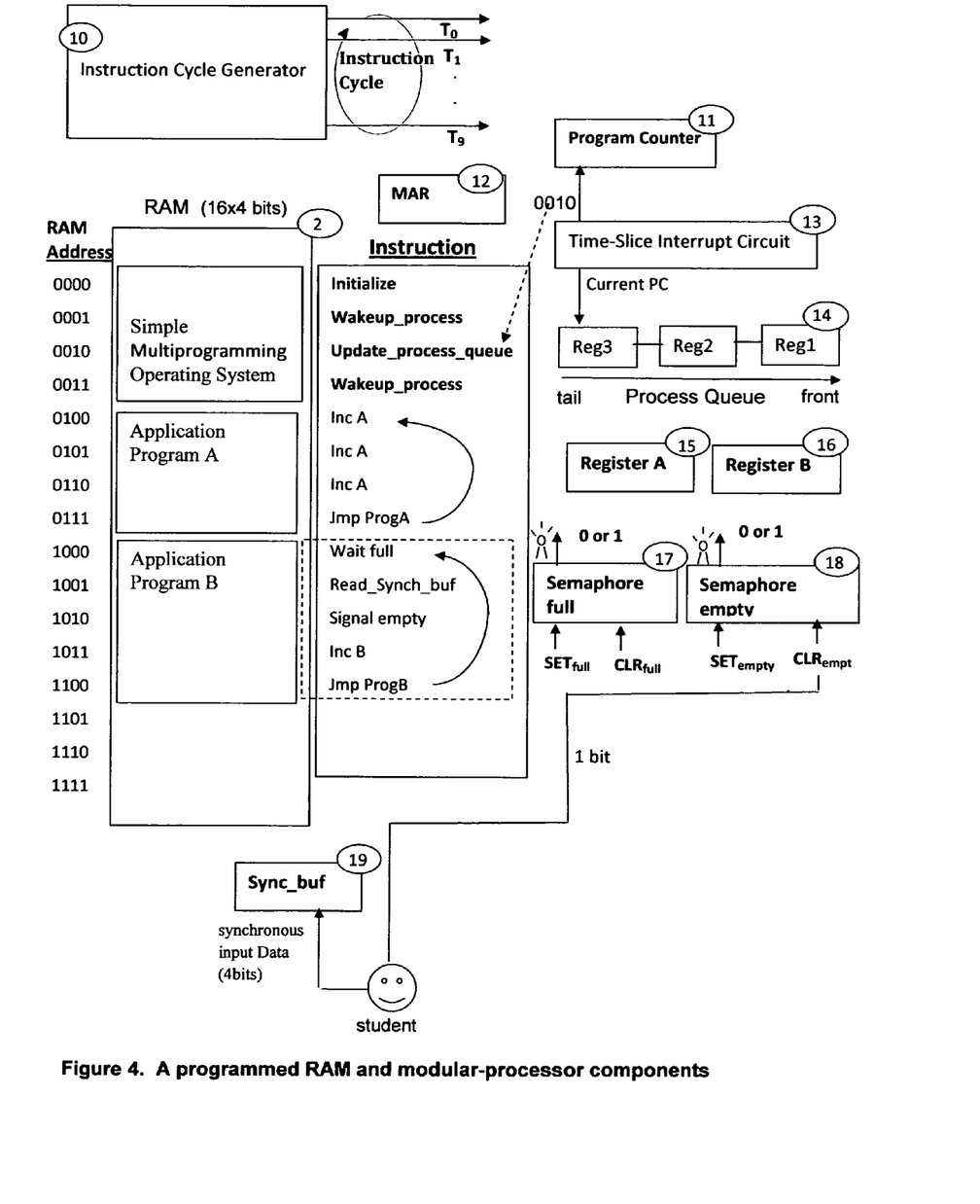
FIG. 4 shows a programmed RAM and modular processor components

FIG. 4 shows a programmed RAM 2 and the YMEP components that will be referenced during this execution scenario. In FIG. 4, the boxes numbered as 10 and 13 are logic circuits constructed by the student. All other numbered boxes (including the RAM 2) are SSI circuit chips.

The following YMEP modules contain the components shown in FIG. 4 (also indicated in FIG. 3):

Execution Driver Module (EDM)—the Instruction Cycle Generator 10 generates the T0, T1, . . . , T9 timing signal sequence in repeating cycles and each cycle executes one instruction. The program counter PC 11 and the memory address register MAR 12 are EDM registers.

Operating Sytem Module—Time-Slice Interrupt Circuit 13, Process Queue 14.

Application Program Instructions Module—Register A 15, Register B 16.

Process Synchronization Module—Semaphore full 17, Semaphore empty 18, the buffer Synch_buf 19.

The 4-bit outputs of all registers and buffers in FIG. 4 can be connected to LEDs to show what they contain.

Figure 5:
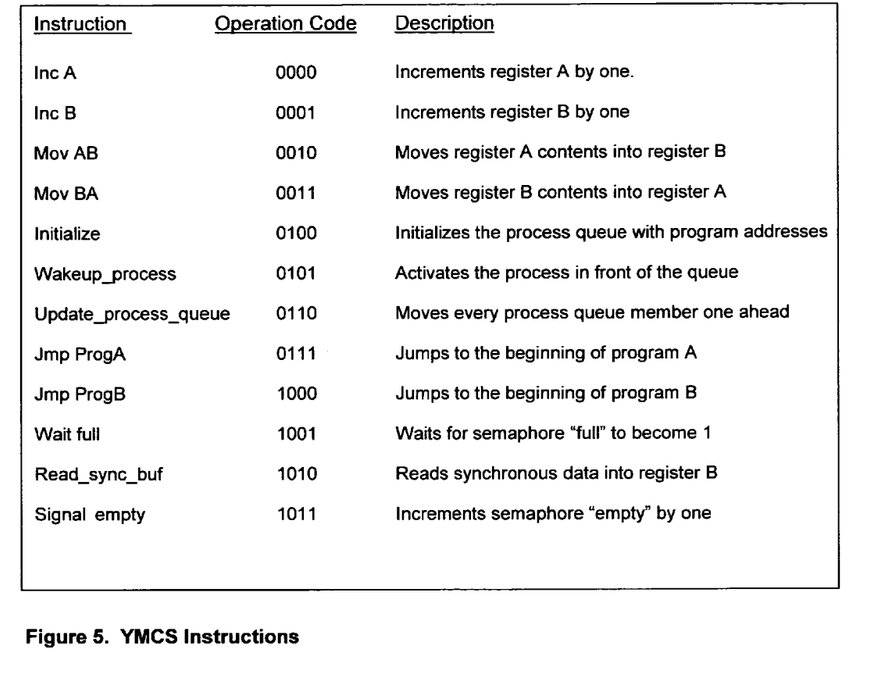
FIG. 5 shows YMCS Instructions

The four white blocks in the RAM in FIG. 4 are memory blocks allocated to the programs identified by the block labels. The scenario instructions for each program block are aligned with the block to the right of the RAM. For your reference, FIG. 5 briefly describes the YMCS instructions. [Start of Execution Scenario]

The student first programs the RAM with the contents shown in FIG. 4 using the address and instruction DIP switches 3 (see FIG. 3). As FIG. 4 illustrates, each 4-bit memory location containing an instruction has a 4-bit address. These addresses range from 0000 to 1111. To write into RAM, the student specifies the memory location via the address DIP switch, specifies the instruction via the instruction DIP switch, and manually sends to RAM a write signal. The four pins of the instruction switch connect to RAM's data input pins and the four pins of the address switch connect to RAM's address pins (not shown). Hence, a defining feature of the EDM is that the RAM can be externally programmed without the involvement of the YMEP.

Turning the power on for the rest of the computer immediately starts the generation of instruction cycles (i.e., labeled as 10 in FIG. 4). All registers and J/K flip-flops start with initial output values of 0. At $T_0$ of the instruction cycle the contents of the PC 11 moves into the MAR 12 which points at the current RAM instruction to execute (e.g., at address 0000), and at $T_1$ the PC is incremented by one pointing at the next RAM instruction (e.g., at address 0001). The value of the MAR stays the same throughout an instruction cycle, and the value of the PC may be changed when execution is interrupted by various events (e.g., time-slice interrupt, input interrupt) during an instruction cycle.

The first instruction to execute in FIG. 4 is the OS instruction Initialize at address 0000. This instruction initializes the Process Queue 14: puts into Reg1 the address for the Application Program A (i.e., 0100) and puts into Reg2 the address of the Application Program B (i.e., 1000).

At the beginning of the second instruction cycle the MAR is automatically set to 0001 and the PC is set to 0010. The Wakeup_process instruction at address 0001 moves into the PC the address of the program in front of the Process Queue and consequently, at $T_0$ of the third instruction cycle, MAR is updated to contain the beginning address of Program A (i.e., 0100) and program flow jumps to the Inc A instruction at this address. This is followed by the execution of instruction Inc A at addresses 0101, and execution of Inc A at address 0110.

Without any interference, the execution of Program A would indefinitely continue because it is an infinite loop where the Jmp ProgA instruction moves into the PC the beginning address of Program A (i.e., 0100). However, the Time-Slice Interrupt Circuit 13 of the Operating System Module counts the number of instructions executed and generates a time-slice interrupt signal (not yet shown) after the execution of the ninth instruction. This signal results in moving the PC value for the running application program into Reg3 of the Process Queue 14 and moving into PC the fixed RAM address 0010 which points at the third instruction in the OS block: the Update_process_queue instruction.

The Update_process_queue instruction moves Reg2 into Reg1 (i.e., address of Program B replaces address of Program A), and moves Reg3 into Reg2 (i.e., the PC value where program A was interrupted gets in line after Program B).

The next OS instruction Wakeup_process moves the front of the Process Queue 14 into the PC and the execution of Program B begins. (The Wakeup_process instruction also clears the counter of the Time-Slice Interrupt Circuit 13 so that the new program will get its fare share of execution time). Hence the OS implements a first-in-first-out (FIFO) scheduling mechanism which alternates between programs A and B every nine instructions (or every 9×10=90 timing signals).

Program B in FIG. 4 contains a procedure to demonstrate process synchronization. This procedure plays the role of the reader process in a typical OS text-book reader/writer (or producer/consumer) synchronization example. In this particular example the other process (i.e., the writer) is not a software process but is the student. (This choice reduces circuit building labor and ensures that the student better understands the utilized synchronization operations wait and signal by manually exercising them). In this particular example, the cooperation that needs to be synchronized is that the student writes into 4-bit Sync_buf 19 a stream of 4-bit input-data elements and process B (executing Program B) reads this stream. But process B and the student have to synchronize each other such that process B will not read the same data element multiple times and likewise the student will not write into Sync_buf 19 new data before process B reads the already written data.

Similar to process B, the student performs the following procedure:

Repeat forever: write into Sync_buf 19;
  signal full 17/*(i.e., set semaphore full to 1);
  wait empty 18/*(wait until semaphore empty is set to 1, clear it to 0 and continue).

Process B begins with executing the Wait full instruction. This instruction repeatedly executes itself waiting for semaphore full 17 to be set to 1 (e.g., by the student). At some point in time the student writes into Sync_buf 19 and sets semaphore full to 1 via a manual Set$_{full}$ signal (see semaphore 17 in FIG. 4) and performs a manual wait operation on semaphore empty 18 (i.e., waits until process B sets it to 1 to indicate that it is finished processing the shared buffer Sync_buf 19). The Wait full instruction, after seeing that semaphore full 17 is signaled (i.e., set to 1), clears semaphore full 17 to 0 (so that the student can signal later for new data). Next process B instruction Read_sync_buf moves the contents of Synch_buf 19 into Register B 16. The Signal empty instruction that follows sets semaphore empty 18 to 1 signaling the user that processing of Synch_buf 19 is finished. The student who has been performing a wait operation on semaphore empty 18 proceeds with manually clearing this semaphore to 0, writes new data into the Synch_buf 19, and signals Program B by manually setting semaphore full 17 via the SET$_{full}$ control signal. The Jmp ProgB instruction puts into the PC 11 the beginning address of Program B and the whole synchronized cycle repeats.

Note that process B can be preempted by the operating system at any point during its execution due to a time-slice interrupt. Likewise the student can leave data entry for a coffee break (while the computer continues its time-shared execution of processes A and B) and come back to continue later. Regardless, these events do not affect the correctness of the synchronous data entry operation described above.
[End of Execution Scenario]

Start of the Detailed Embodiment

Figure 6:
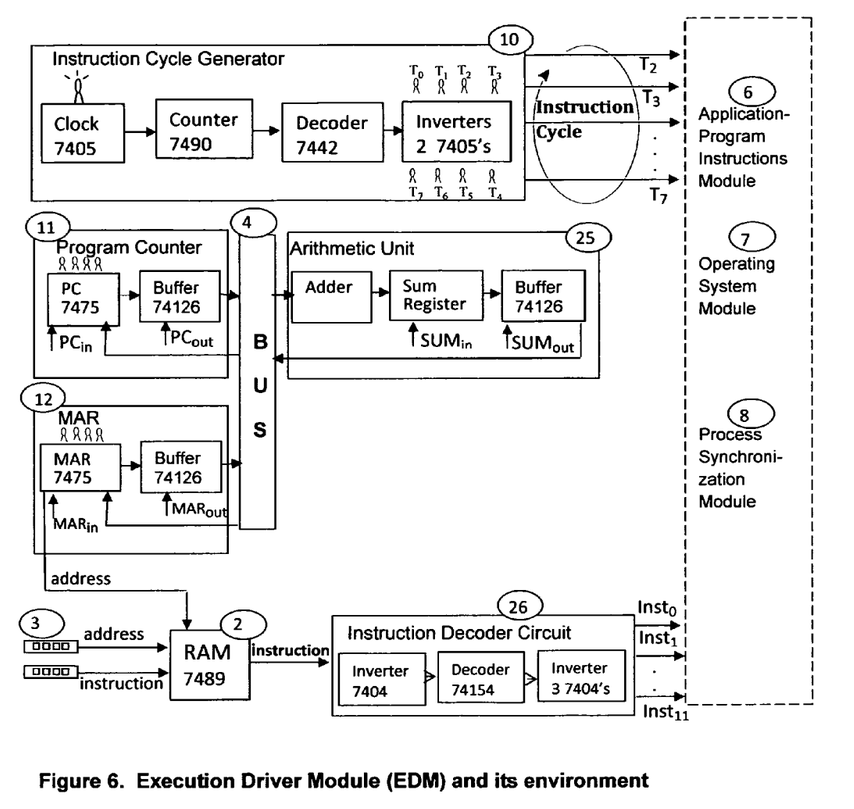
FIG. 6 shows the Execution Driver Module (EDM) and its environment

FIG. 6 shows the Execution Driver Module (EDM) 5 of FIG. 3 and its environment. All black boxes in FIG. 6 are EDM components and the BUS 4 is shared by all YMCS modules. The BUS 4 consists of four parallel conductor strips. All other black boxes are standard TTL SSI chips (installed on a breadboard) and also indicate their TTL identification numbers.

The Instruction Cycle Generator 10 contains a clock circuit (implemented via a capacitor and three open-collector inverters of a 7405 chip) that outputs via a chip pin a continuous and alternating stream of HIGH (e.g., 5 volts) and LOW (e.g., 0 volt) voltage levels. An LED that connects to the output of the clock shows the alternating clock signals. For comfortable viewing of the operation, a typical clock speed (determined via the capacitance of the capacitor used—e.g. 33uf) is two ticks per second. The clock speed can be easily changed for a faster or slower operation by replacing the capacitor.

The 7490 counter chip that receives the clock-signal stream counts the alternating clock signals. It starts with an output of 0000 and when it reaches 1111 it wraps around back to 0000 and continues counting. The decoder chip continuously decodes the 4-bit count that it receives from the four output pins of the counter into one of ten individual timing signals each of which is put on a different decoder output pin. These are active-LOW signals and the two inverter chips (each containing six NOT gates) next to the decoder invert these active-LOW signals into active-HIGH timing signals $T_0, T_1, \ldots, T_7$.

The signal sequence $T_0, T_1, \ldots, T_9$ constitute an instruction cycle and these cycles repeat as long as the power is on. In the particular embodiment presented in this description, signals $T_0$ and $T_1$ are used for instruction fetch, $T_2$ and $T_3$ are used for instruction execution, $T_4$ and $T_5$ are used by the Time-Slice Interrupt Circuit 13 of FIG. 4, and $T_6$ and $T_7$ are used by the Interrupt Processing Circuit 21 of FIG. 4. $T_8$ and $T_9$ are unused and provide for visual separation of instructions during execution and they can also be utilized for future expansion. Note that these non-overlapping timing signal assignments modularize in time the associated operations and provide for more simplicity.

All registers in YMCS are 7475 chips each containing four data flip-flops each of which stores one bit of data. A 7475 chip (for example the PC 11 in FIG. 6) contains four input pins, four output pins, and an input control pin (e.g., PC$_{in}$) that enables reading input data. Likewise, all YMCS buffer chips are 74126 chips each containing four tri-state buffers. A 74126 chip contains four input pins, four output pins, and output control pins. A YMCS 7475 register typically gets its input from the four BUS lines via its four input pins, the register contents is always present on its four output pins each of which is connected to an input pin of a 74126 buffer chip, and the four output pins of a 74126 buffer chip connects to the four BUS lines. When the output control (e.g., PCout in FIG. 6) of a buffer chip is HIGH its input data (e.g., the output of the register that connects to it) flows out to the BUS lines through its output pins. If this control input is LOW, the buffer output pins are disconnected from the BUS.

FIG. 6 also indicate data and control flow via arrows. Throughout this document, unlike conventional representation techniques which use only line segments, all circuit diagrams indicate the expected data-flow behavior with arrows. The open ended arrows in FIG. 6 indicate data-flow control signals. For example, PC$_{in}$ signal enables BUS-data-flow into the PC via its four input pins, and PC$_{out}$ signal opens the four buffer gates to allow PC output to flow into the BUS. Likewise, SUM$_{in}$ signal in the Arithmetic Unit 25 enables the Sum Register to accept the four-bit Adder output, and the SUM$_{out}$ signal allows Sum Register contents to flow into the BUS.

The Program Counter (PC) chip 11 contains the 4-bit RAM address of the next instruction to execute. It is incremented at the beginning of each instruction cycle. Incrementing the PC is implemented in two time steps:

1) At time $T_0$, the control signals PC$_{out}$ and Sum$_{in}$ are activated. The PC$_{out}$ signal opens the buffer gates that connect to the BUS allowing the PC contents to flow into the adder, and the Sum$_{in}$ signal stores the incremented address in the Sum Register. (The implementation is that $T_0$ signal connects to PC$_{out}$ and Sum$_{in}$ pins—e.g., via wires).

2) At time $T_1$, the control signals Sum$_{out}$ and PC$_{in}$ are activated. The Sum$_{out}$ signal opens the buffer gates that connect to the BUS allowing the Sum-Register contents to flow into the BUS, and the PC$_{in}$ signal allows the incremented address into the PC Register. (The implementation is that the $T_1$ signal connects to Sum$_{out}$ and PC$_{in}$ pins).

Instruction fetch is performed via connecting the $T_0$ signal to MAR$_{in}$ pin. At $T_0$ the PC contents which is on the BUS flows into the MAR and the 4-bit RAM instruction at this address appears at the RAM output pins. The Instruction Decoder Circuit 26 decodes this 4-bit active-LOW RAM output into one of fourteen active-HIGH instruction signals. The value of the MAR and therefore the corresponding instruction signal stay the same during the rest of the instruction cycle.

The four address pins and the four data input pins of RAM connect to the DIP switches for manual entry of program instructions. The address pins of RAM also connect to the output pins of the MAR and these address sources cannot be simultaneously active. Therefore, when manually programming the RAM the student powers up only the RAM board so that only the address DIP switches are in effect. Likewise, before program execution, the student turns off all the address switch elements so that only the MAR is in effect.

When the EDM is powered up, one can visually monitor the continuously alternating clock LED, the timing-signal LED's turning on and off in sequence, the 4-bit values of the PC and the MAR and when they change, and the LED for the currently activated RAM instruction.

The EDM's role in YMCS is solely to generate the instruction-cycle timing-signal sequence and the instruction signals for the operation codes stored in RAM and this module has no knowledge of what the work modules are doing with these signals.

Figure 7:
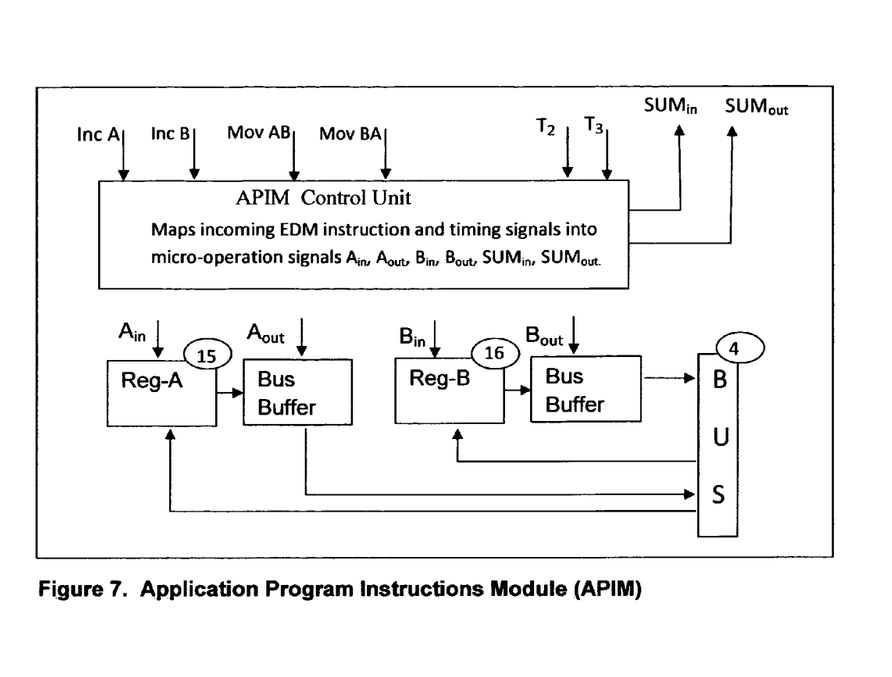
FIG. 7 shows the Application Program Instruction Module (APIM)

FIG. 7 shows the components of the Application Program Instructions Module (APIM). It consists of the APIM's own Control Unit, Register A 15, Register B 16, and associated bus buffers. The APIM Control Unit maps the incoming EDM instruction and timing signals into appropriate control signals that implement the application program instructions.

Figure 8:
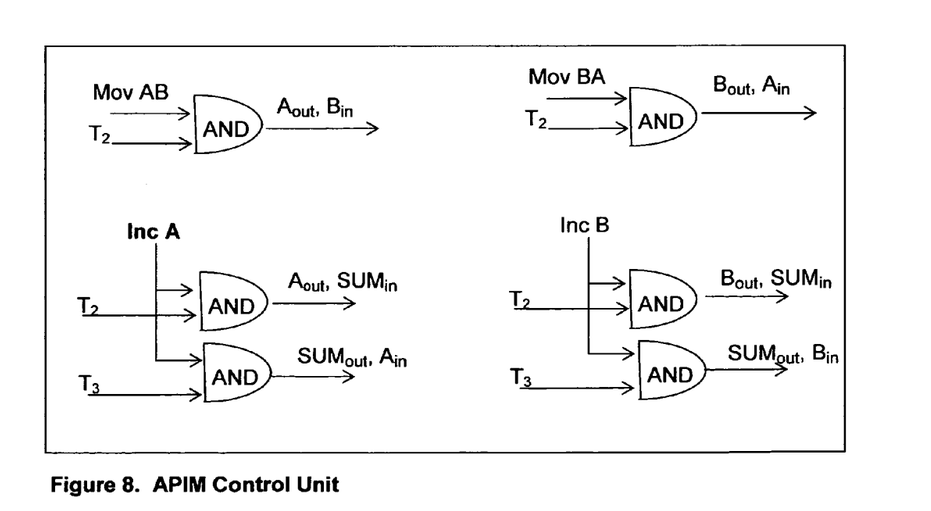
FIG. 8 shows the APIM Control Unit

FIG. 8 shows how the APIM Control Unit implements its instructions. The instruction signals come from the Instruction Signal Decoder 26 of FIG. 6 (e.g., via wires), and the timing signals come from the Instruction Cycle Generator 10 of FIG. 6. For example, when the instruction in RAM pointed by MAR is Mov AB, the instruction line (i.e., wire) for Mov AB will be active HIGH throughout the instruction cycle. At time T2, the AND gate for this instruction will activate the lines (i.e., wires) that connect to Aout and Bin pins of the chips shown in FIG. 7. As a result, the data in register A will flow through the BUS into register B. The Mov BA instruction operates similarly. The implementation of the instructions Inc A and Inc B is similar to incrementing the PC discussed earlier. The AND gates that FIG. 8 shows are in 7408 chips and a chip contains four AND gates each one having two input pins and one output pin as shown in the figure.

Using the EDM and APIM only, the student can program the RAM using the four instructions shown in FIG. 8 in any sequence and visually verify the computer's correct operation.

Figure 9:
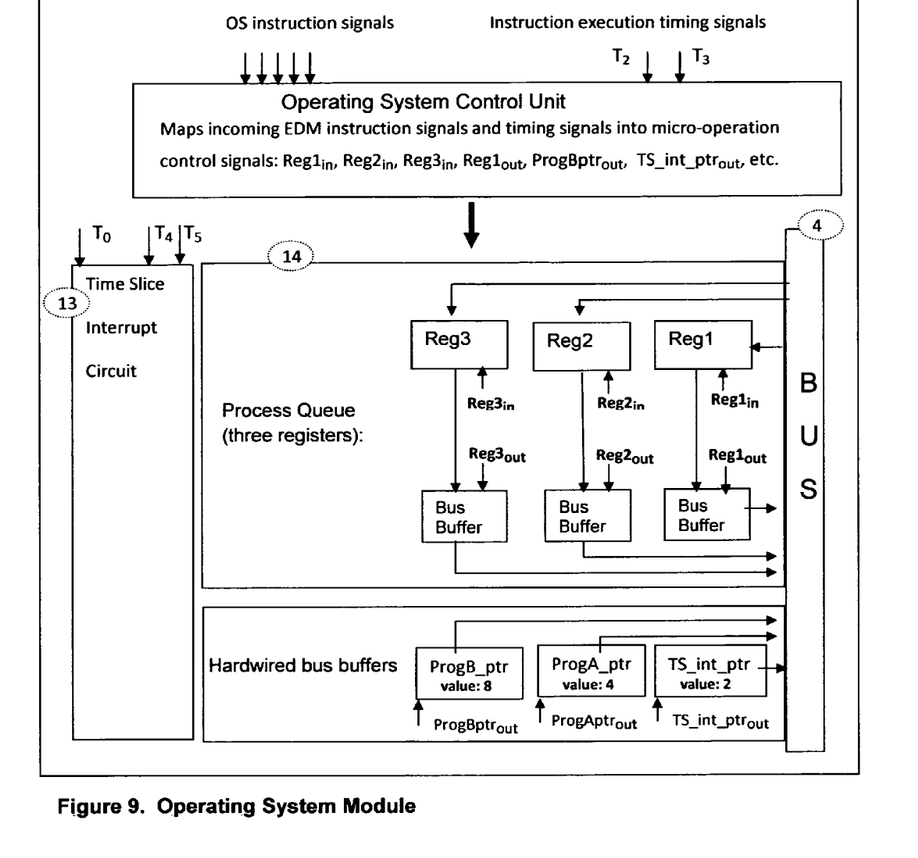
FIG. 9 shows the Operating System (OS) Module

FIG. 9 shows the components of the Operating System Module. Like other YMEP modules, it contains its own control unit. The other components are the Time-Slice Interrupt Circuit 13, the Process Queue 14, and three hardwired bus buffers at the bottom of the figure.

The Process Queue is made of three register-buffer chip pairs with the already discussed familiar BUS connections and data-flow control signals.

The hardwired bus buffers ProgA_ptr and ProgB_ptr are used by the OS instruction initialize to initialize the registers Reg1 and Reg2 of the process queue, respectively. The hardwired bus buffer TS_int_ptr is used by the Time-Slice Interrupt Circuit 13 described below.

Figure 10:
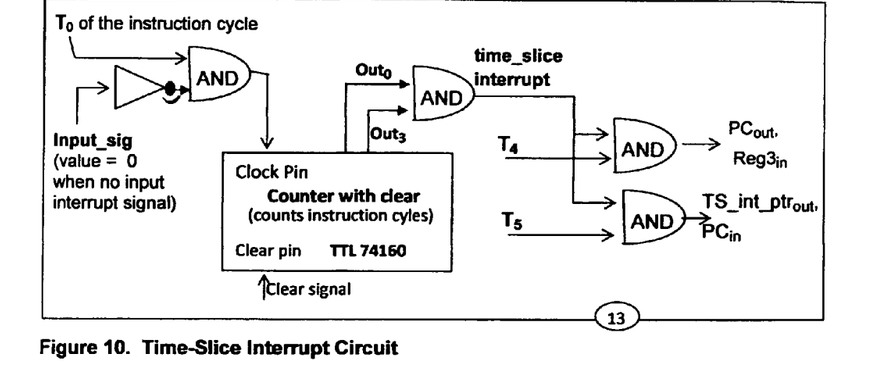
FIG. 10 shows a Time-Slice Interrupt Circuit

FIG. 10 shows the Time-Slice Interrupt Circuit. The counter (a 74154 chip) counts the number of instructions executed via the $T_0$ signal of the instruction cycle connected to its clock pin (i.e., as long as the Input_sig is 0). When the count reaches nine (i.e., 1001), the AND gate connected to the $Out_0$ and $Out_3$ pins of the counter generates a time-slice interrupt signal. As the figure shows, this interrupt signal AND T4 of the instruction cycle moves the PC value for the executing process into Reg3 of the process queue, and T5 signal of the instruction cycle AND the interrupt signal move into PC the value of the TS_int_ptr which points at memory location 0010. Consequently, as described in the execution scenario earlier, the execution control jumps to the operating system instruction at RAM location 0010 (i.e., Update_process_queue). This instruction updates the process queue and the Wakeup_process instruction following it starts the process waiting in front of the queue. (Note that the instruction-cycle count and the time-slice interrupt is disabled when the Input_sig is set to 1—as it will be explained later, this happens when the user enters asynchronous data)

Figure 11:
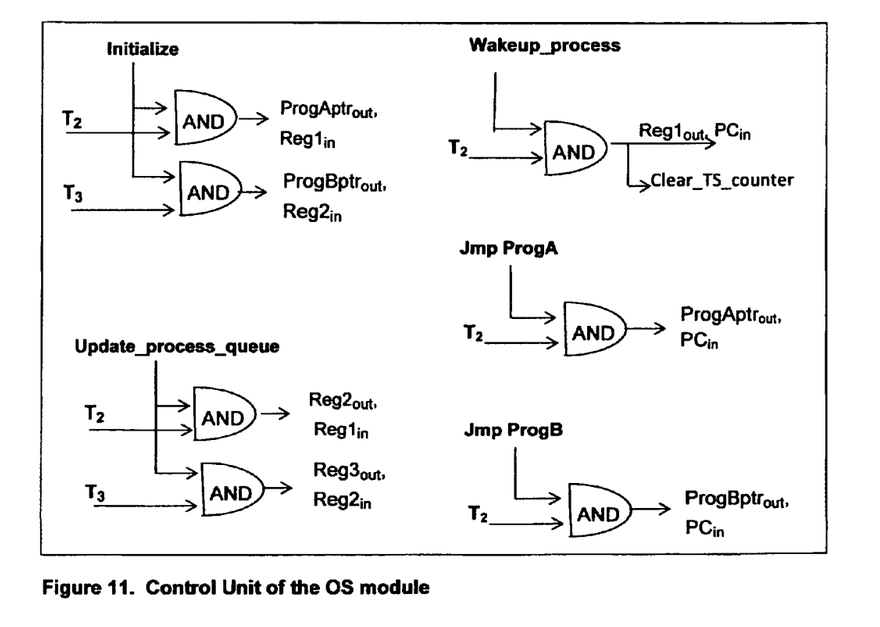
FIG. 11 shows the Control Unit of the OS

FIG. 11 shows how the OS Control Unit implements the OS instructions. A commercial operating system implements functions such as Update_process_queue, Wakeup_process, and Initialize in software using lengthy algorithms and vast data structures. Also, in a commercial operating system, the process-queue is a software data structure containing process IDs pointing at process control blocks each of which contain large amount of process information (e.g., values of all CPU registers and flags to be loaded back, other administrative information) so that the process can be restarted as if logically it was not preempted. The YMCS achieves its goal by implementing all operating system software functions as simple hardware instructions and by implementing software data structures (e.g., the process queue) in hardware.

For simplification, the YMCS operating system only implements a multiprocessing mechanism and leaves out other OS functions. For example all of the OS software resides at a fixed location in RAM, and the memory management function of a commercial operating system is reduced to predefined memory blocks allocated to application programs and an interrupt routine.

A commercial operating system also offers a large number of software service functions (e.g., for file processing, for input/output) to be used in application programs. The instructions Jmp ProgA and imp ProgB of the OS module 7 serve as example services not used in the operating system but used by the application programs.

Figure 12:
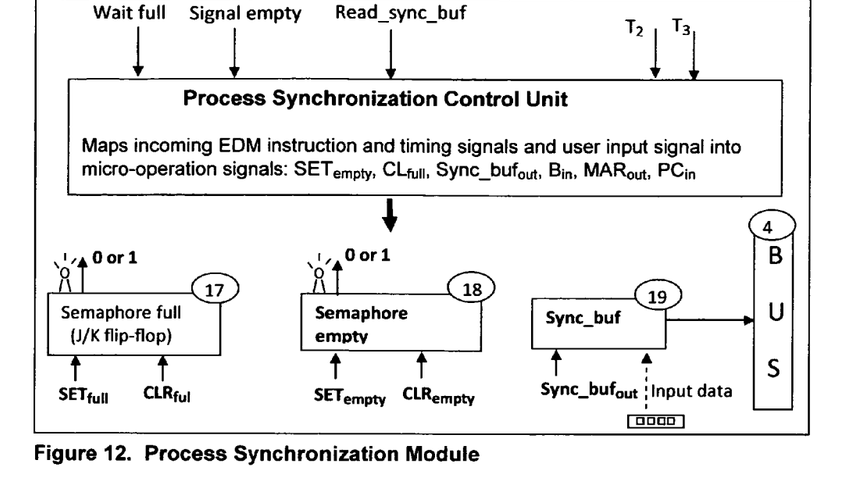
FIG. 12 shows the Processor Synchronization Module

FIG. 12 shows the components of the Process Synchronization Module. It contains its own control unit. It also contains two semaphores 17 and 18, and the input buffer Sync_buf 19 connected to the common BUS 4. The execution scenario presented earlier showed how these semaphores and the buffer were used.

Figure 13:
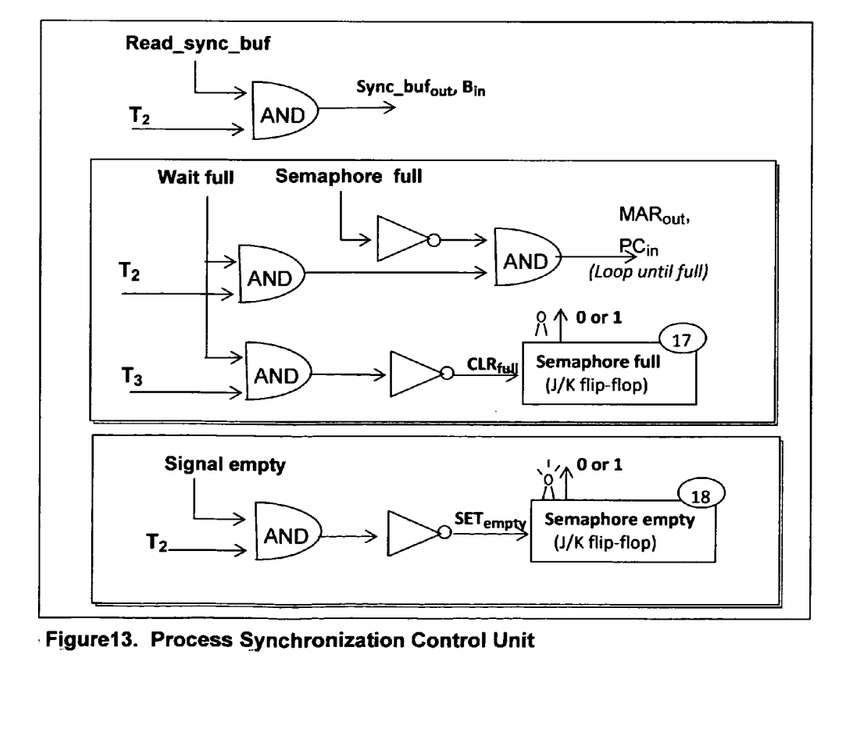
FIG. 13 shows the Processor Synchronization Control Unit

FIG. 13 details the control unit of the Process Synchronization Module of FIG. 12. It contains the implementation of the three instructions for this module: Read_sync_buf, Wait full, and Signal empty. As explained before, the signals for these instructions come from the Instruction Decoder Circuit in EDM and the timing signals come from the Instruction Cycle Generator in EDM.

The instruction Read_sync_buf simply moves through the BUS 4 the contents of the input buffer Sync-buf 19 filled by the student into Register B 16 of FIG. 7.

The instruction Wait full implements in hardware the standard definition of the OS software-semaphore-function Wait. It repeats executing itself until semaphore full is set to 1 (e.g., by the student). When the semaphore is set to 1 it clears the semaphore to 0 and it is done. (The NOT gates used in this embodiment are in TTL 7404 chips).

The Signal empty instruction sets semaphore empty to 1 for signaling the other shared buffer Synch_buf user (e.g., the student) that the buffer is now free for use.

The "wait" and "signal" operations utilized here are standard OS software service functions. This invention implements them as atomic hardware instructions (please refer to the generic definition of a YMC instruction given in paragraph 0007). Also, a conventional computer system uses RAM locations for implementing semaphores. This invention implements semaphores using J/K flip-flops located in the Process Synchronization Module 8 which is part of the processor.

End of the Detailed Embodiment

Although only an SSI-circuit-chip embodiment of the YMCS has been presented here, it should be obvious to those of ordinary skill in the art that the YMCS embodiment presented here can also be implemented by using a logic-simulator software product without departing from the scope of the invention.

Figure 14:
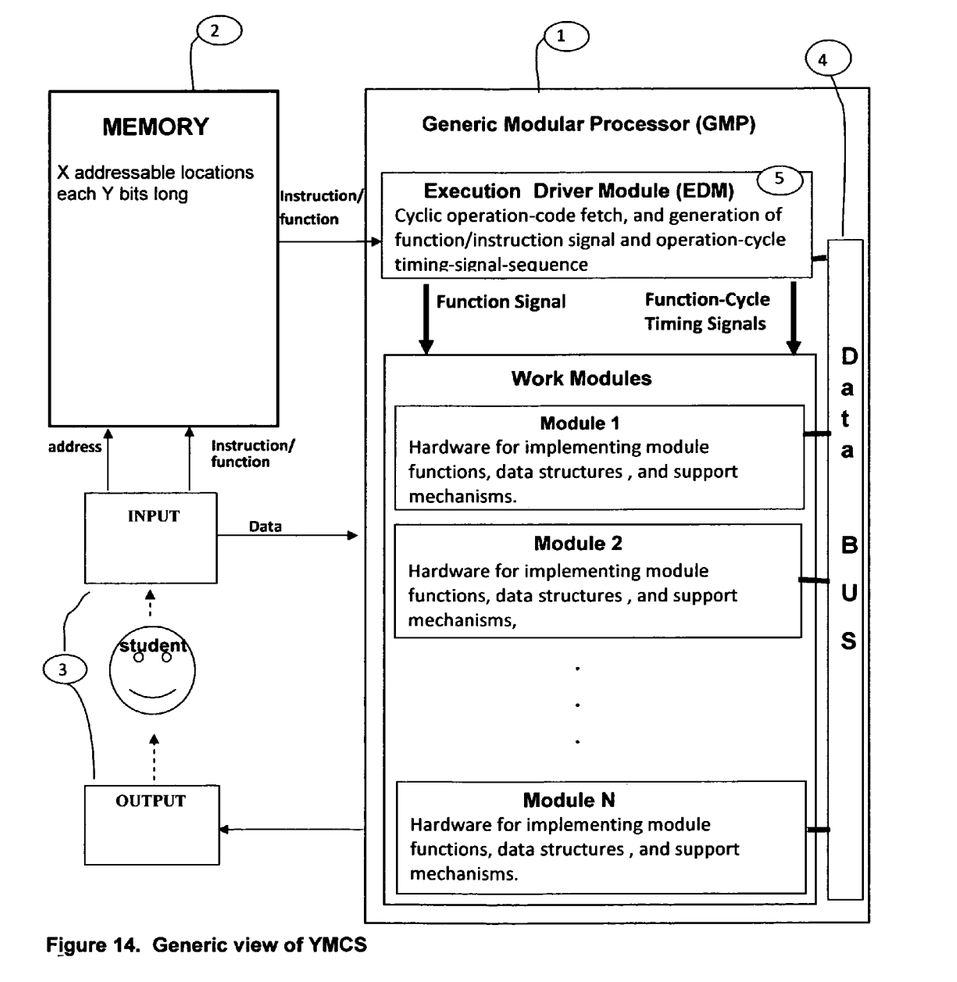
FIG. 14 shows the generic view of the YMCS

It should also be obvious to those in ordinary skill in the art that the educational computer system presented in detail in this description is an example application of a generic computer system model that facilitates implementing conventional software functions/procedures in hardware (e.g., as atomic hardware instructions), a fundamental concept created and applied in developing the YMCS. FIG. 14 shows this generic view of YMCS.

Without departing from the scope of the invention, one can change the size, the functionality, and the number of the YMCS work modules (e.g., implementing process synchronization via two software processes, adding an ALU module, implementing a file system, increasing OS functionality) using the EDM of the particular embodiment presented here.

By using the generic nature of the system model, without departing from the scope of the invention, one can also change the parameters of the EDM (i.e., the number of operation codes, the number of instruction cycle timing signals) and RAM (e.g., a RAM with X addressable words each containing Y bits) and one can implement customized special-purpose computers each with a multitude of instructions/functions of arbitrary size (e.g., an industrial process control system).

Without departing from the scope of the invention, one can also modify the RAM access mechanism (e.g., by including MBR and IR registers), and expand the instruction format to teach operation of 1-address, 2-address, 3-address computers.

The invention claimed is:

1. A method for teaching the workings of an Operating System multiprocessing mechanism, the method comprising steps "a" through "l" of the following stepwise process of constructing and operating and educational model computer system, the steps including:
 (a) Building an instruction-execution driver logic-circuit that implements:
  (i) a timing signal generator that cyclically generates a sequence of instruction-cycle timing signals at a rate of approximately two signals per second, wherein this slow operation makes the operation of computer circuits visually traceable and verifiable at every step of the building process via LED's connected to output pins of the computer circuits;
  (ii) a logic circuit that fetches a RAM instruction pointed by a program counter, PC during a first signal of an instruction cycle and increments the PC during a second signal of the instruction cycle; and
  (iii) a logic circuit that decodes fetched RAM instruction codes ranging from 0000 to 1111 and generates a distinct instruction signal for each instruction code;
 (b) Building logic circuits that implements the application program instructions "increment register A", "increment register B", "Jump_ProgA" that jumps to the start of program A at RAM location 0010, and "Jump_ProgB" that jumps to the start of program B at RAM location 1001;
 (c) Reserving locations 0000-0011 of a 16×4 bit RAM for Operating System multiprocessing instructions, reserving RAM locations 0010-1000 for application program instructions of a process A, and reserving RAM locations 1001-1100 for application program instructions of a process B;
 (d) Configuring a buffer chip named ProgA_ptr with the value 0010, and connecting the output pins of this chip to a data transfer BUS;
 (e) Configuring a buffer chip named ProgB_ptr with the value 1001, and connecting the output pins of this chip to the data transfer BUS;
 (f) Building a hardware process-queue consisting of three 4-bit registers R1, R2, R3, wherein R3 is the tail of the queue, R2 and R1 is the front of the queue, wherein input pins and output pins of each register connect to the data transfer BUS;
 (g) Building logic circuits for the following Operating System instructions that operate on the process queue of the above step "f":
  (i) the instruction "Initialize" that moves the address of program A from ProgA_ptr buffer of step "d" above into R1 of the process queue, and moves the address of program B from ProgB_ptr buffer of step "e" above into R2 of the process queue;
  (ii) the instruction "Wakeup_process" that starts an execution of a process in the front of the process queue by moving the starting address of said program from R1 of the process queue into the program counter register PC; and
  (iii) the instruction "Update_process_queue" that moves R2 to R1 and R3 to R2;
 (h) Building a process interrupt circuit that counts the number of instructions that a running process executes and generates a preemption interrupt signal after the tenth instruction wherein this signal preempts the running process by moving a PC value into R3 of the process-queue of step "f" above and moves into the PC the RAM address of the Update process queue instruction of the Operating System code in step (i) below;
 (i) Programming the first four locations of the RAM as: Initialize, Wakeup_process, Update_process_queue, Wakeup_process;
 (j) Programming the RAM locations for program A reserved in step "c" above with application program instructions of step "b" above, preferably with an instruction IncA, the last instruction being "Jump_ProgA";
 (k) Programming the RAM locations for program B reserved in step "c" above with application program instructions of step "b" above, preferably with an instruction IncB, the last instruction being "Jump_ProgB"; and
 (l) Running the computer with initial PC value of 0000 and observing the cyclic alternating execution of program A and program B, whereby running a program is preempted by Operating System hardware after running ten instructions, and the execution of the other waiting program is started by the Operating System software.

2. A method for teaching and demonstrating how software process synchronization works, the method comprising the steps "a" through "f" of the following stepwise process of constructing and operating an educational model computer, the steps including:

a. Building an instruction execution driver module that implements:
   (i) a timing signal generator that cyclically generates a sequence of instruction-cycle timing signals;
   (ii) a logic circuit that fetches a RAM instruction pointed by a PC during a first signal of the instruction cycle and increments the PC during a second signal of the instruction cycle; and
   (iii) a logic circuit that decodes fetched RAM instruction codes and generates a distinct instruction signal for each instruction code;
b. Using the instruction-cycle timing signals and an instruction signal of above step "a", implementing the Operating System software procedure/function WAIT as an atomic hardware instruction waiting on a J/K flip-flop used as a semaphore named "FULL" which is initially set to 0;
c. Using the instruction-cycle timing signals and an instruction signal of above step "a", implementing the Operating System software function SIGNAL as an atomic hardware instruction signaling a J/K flip-flop used as a semaphore named "EMPTY" which is initially set to 1;
d. Entering into RAM a program that begins with the instruction WAIT, continues with a block of instructions followed by the instruction SIGNAL, and loops back to the beginning instruction WAIT to re-execute itself;
e. Executing the program of step "d" above wherein this program plays the role of the consumer of the classical consumer-producer synchronization; and
f. In a loop, playing the role of the producer by manually signaling the semaphore FULL when the program of step "e" is waiting on it, and by manually clearing the semaphore EMPTY after said program signals it.

* * * * *